Jan. 12, 1943. S. A. COGSDILL 2,308,055
ADJUSTABLE COUNTERSINK STRUCTURE
Filed April 6, 1942
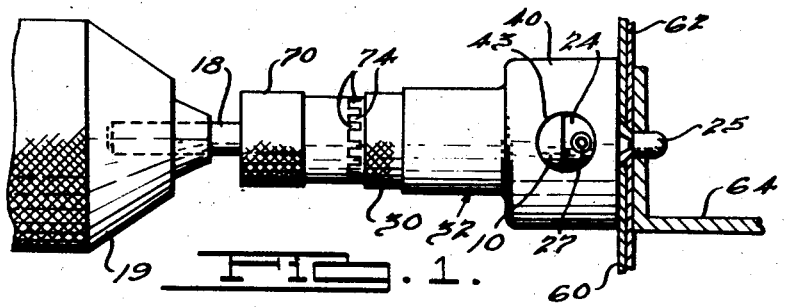
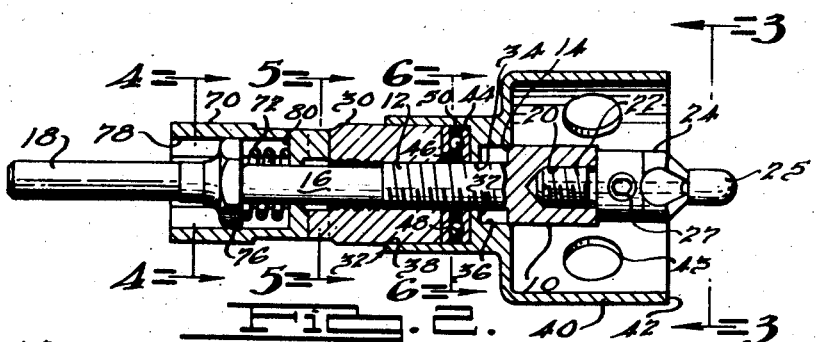
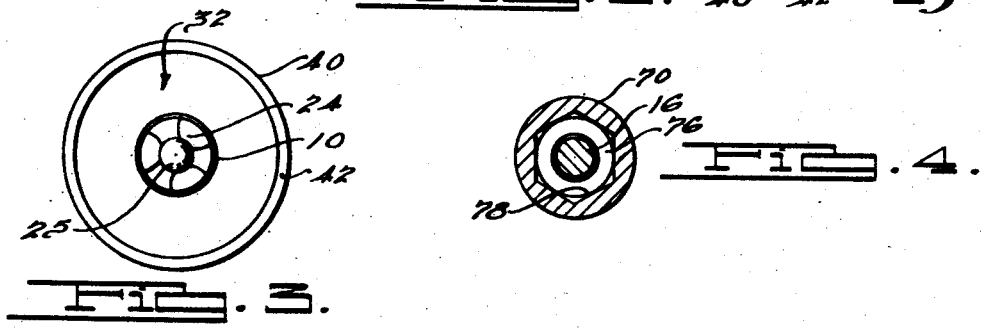
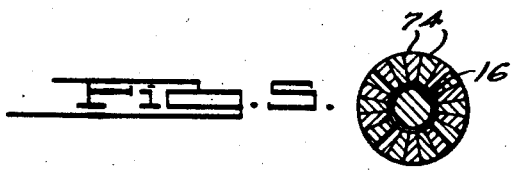
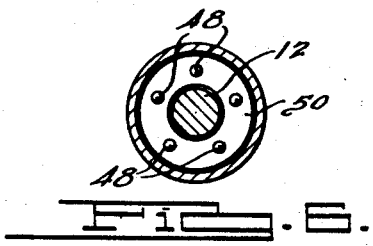
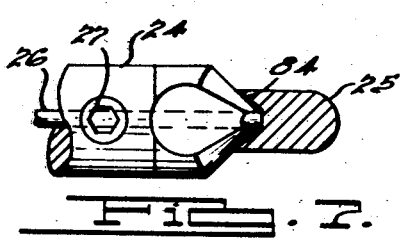
INVENTOR
Stuart A. Cogsdill.
BY
Harness, Dickey & Pierce
ATTORNEYS.

Patented Jan. 12, 1943

2,308,055

UNITED STATES PATENT OFFICE 2,308,055

ADJUSTABLE COUNTERSINK STRUCTURE

Stuart A. Cogsdill, Detroit, Mich., assignor to Cogsdill Twist Drill Co., Detroit, Mich., a corporation of Michigan Application April 6, 1942, Serial No. 437,735

4 Claims. (Cl. 77—73.5)

This invention relates to countersinks and particularly to that type thereof embodying means adjustably associated therewith for limiting the depth to which the countersink may be projected into a piece of work, and involves certain improvements in the construction shown and claimed in my United States Letters Patent No. 2,242,510, issued May 20, 1941, on the same subject matter.

Objects of the invention includes the provision of certain details of construction which experience in production with the construction of the tool shown in my above identified earlier patent has shown desirable in both manufacture and operation; the provision of a tool of the type described in which the depth limiting sleeve is provided with a continuous and unbroken surface for contact with the surface of the work being operated upon; the provision of a tool of the type described in which that end of the depth limiting sleeve adapted for contact with the work is not only continuous and unbroken but is hardened and polished; the provision of a tool of the type described in which the depth limiting skirt not only includes the features above described but in addition is materially enlarged in diameter as compared to the diameter of the body of the tool; the provision in a tool of the type described of a new and novel construction for the countersink pilot enabling it to cooperate with the countersink in such a manner as to prevent flutter of the countersink during operation; the provision in a tool of the type described of a countersink pilot the rear end of which is formed for point contact with the cutting edges of the countersink on the outer diameter of the pilot whereby to eliminate a gap between the outer surface of the pilot and the cutting edges of the countersink; the provision of a novel construction for maintaining the adjustment locking sleeve against relative rotation on the shank of the countersink; and the provision of a polygonal member pressed upon the shank of the tool and slidably engaging the complementarily shaped bore in the adjustment locking sleeve of the tool for preventing rotation of the adjustment locking sleeve and further serving as a spring abutment.

The above being among the objects of the present invention the same consists in certain novel features of construction and combinations of parts to be hereinafter described with reference to the drawing, and then claimed, having the above and other objects in view.

In the accompanying drawing which illustrates a suitable embodiment of the present invention and in which like numerals refer to like parts throughout the several different views, Fig. 1 is a fragmentary, side elevational view illustrating a countersink constructed in accordance with the present invention operatively gripped by the chuck of a suitable turning device and positioned in operative relation with respect to the piece of work;

Fig. 2 is an enlarged sectional view taken axially through the countersink shown in Fig. 1;

Fig. 3 is an end view of the countersink shown in Fig. 2 taken from the righthand end thereof and looking in the direction of the arrows 3—3 of Fig. 2;

Fig. 4 is a transverse sectional view taken on the line 4—4 of Fig. 2;

Fig. 5 is a tranverse sectional view taken on the line 5—5 of Fig. 2;

Fig. 6 is a transverse sectional view taken on the line 6—6 of Fig. 2; and,

Fig. 7 is a fragmentary, partially broken, partially sectioned view illustrating the construction of the pilot member and its manner of cooperating with the tool bit in greater detail.

While the present invention is applicable for use in connection with the countersinking of a hole or opening in any kind or type of work piece where it is desired to limit the depth of the countersunk opening, its greatest application at the present time is in connection with the countersinking of holes in airplane structures designed to receive flush type of rivets therein, and it is particularly with this use in view that the improvements of the present invention over the construction shown in my issued patent is concerned.

Referring now to the drawing and particularly to Fig. 2, the countersink shown includes a shank or shank member all portions of which are of circular conformation and including a head portion 10 integrally and concentrically joined to one end of a body or shank portion 12 of lesser diameter so as to form a shoulder 14 between them, the portion 12 at its opposite end being integrally and concentrically joined to a smaller portion 16 which in turn is integrally concentrically joined to a still smaller portion 18 adapted to be gripped by the chuck 13, shown in Fig. 1, of a drill or other turning device employed for the purpose of driving the same.

The head 10 is provided with a central threaded bore 20 in which the shank 22 of the tool bit or countersink proper 24 is threadably received and through which it receives its driving movement. In the particular case shown the tool bit 24 is provided with a pilot 25 comprising a concentric cylindrical member having a rounded outer edge and formed integrally with a pin 26 removably received within an axial opening in the countersink 24 and secured against movement with respect thereto by means of a set screw 27 threaded through the side of the countersink 24 and bearing against the pin 26. The structure thus far described is similar to a conventional countersink having a removable cutting end portion or bit, and while it may be used for countersinking purposes in the form thus described, it would not include any means for predetermining the depth of the countersunk openings to be formed thereby.

In order to predetermine the depth to which the bit 24 may countersink an opening, the shank portion 12 is externally threaded and receives thereon a nut member 30 which is of cylindrical character and preferably has a knurled exterior surface particularly at the rear end thereof. A sleeve member 32 surrounds the shank 12 between the nut 30 and the head 10 of the shank and includes one portion having a central bore 34 in which the shank portion 12 is relatively closely but slidably received, an adjacent portion having a bore 36 in which the rear end of the head 10 is relatively closely but slidably received and forming a radial shoulder 37 between it and the bore 34, a rear portion having a bore 38 and relatively loosely surrounding the forward end of the nut 30, and an outer skirt portion 40 terminating in a continuous and unbroken circular end surface 42 which is preferably at least 50% greater in diameter than the diameter of the main body portion of the sleeve 32 for reasons which will hereinafter be more fully described. The portion 40 is preferably provided with a plurality of holes 43 therethrough for the escape of chips from the interior thereof as well as for inspection purposes and to provide ready access to the set screw 27.

Between the bores 34 and 38 a radial shoulder 44 is formed in the sleeve member 32 and interposed between such shoulder 44 and the forward end of the nut 30 within the sleeve member 32 and in surrounding relationship with respect to the shank portion 12 is a thrust bearing. This thrust bearing includes a pair of hardened steel washers 46 separated by a plurality of balls 48, the latter being confined in angularly spaced relation with respect to each other by means of a ball retainer 50. This construction is preferable to that employed in my previous construction in which a relatively large number of balls were inserted directly between the opposed hardened faces of the sleeve and nut as it has been found that by the use of the hardened washers 46 and a smaller number of balls maintained in position by the retainer 50, a freer running, longer lived and generally more satisfactory construction is provided.

Cooperation of the shoulder 14 on the shank and the shoulder 37 on the sleeve 32 will prevent the sleeve 32 from being removed forwardly over the operative end of the structure, and as long as the nut 30 is threaded on the shank portion 12 cooperation of the shoulder 44 with the forward end of the nut 30 through the balls 48 and washers 46 will prevent removal of the sleeve in a rearward direction. It will also be understood that except when the nut 30 is threaded to the full extent of its movement to the right as viewed in Fig. 2, the sleeve 32 will have a certain amount of axial movement relative to the shank which in itself is not undesirable.

In connection with the question of the sleeve member 32 scoring the work, the tool in my prior patent above referred to employed a sleeve functioning in the same manner as the sleeve 32 herein described except that it was of uniform diameter throughout and the forward or operative end of the same carried a short sleeve of non-metallic material terminating in a serrated edge adapted for contact with the work being operated upon. While the construction in my prior patent is fully operative and many tools have been made and used constructed in accordance therewith, the non-metallic sleeve for contact with the work has been shown to be subject to more wear than is desirable and not as efficient as desirable in cooperating with the tool to line it up perpendicularly with respect to the surface of the work being acted upon. I have found that if the diameter of that end of the sleeve which limits the penetration of the countersink into the work is made at least 50% greater than the body portion thereof, contact of this end of the sleeve with the work more readily serves to aid in bringing the countersink into perpendicular relation with respect to the work at the point where the countersink is operating upon it. Accordingly, in accordance with the present invention and as illustrated in the drawing the diameter of the operative end of the sleeve 32 is increased as shown. In the particular case shown the skirt portion 40 is shown of cylindrical conformation, although it will be appreciated that the particular shape is unimportant as long as it terminates in the enlarged circular end referred to.

Furthermore, I have discovered that if instead of serrating the operative end of the limiting sleeve structure as shown in my former patent this surface is formed as an integral part of the metallic sleeve itself and that surface thereof adapted to contact the work is made continuous and uninterrupted and is hardened and polished, scoring of the work upon contact with the sleeve is substantially reduced and entirely eliminated in most cases and this is the reason for so forming this end of the sleeve 32 in the tool illustrated.

In order to maintain the adjusted position of the nut 30 on the shank portion 12 the same general type of mechanism as in my prior patent is employed. In other words, a sleeve 70 is relatively closely but slidably received upon the shank portion 16 and is constantly urged towards the nut 30 by means of a compression spring 72. The cooperating ends of the sleeve 70 and of the nut 30 are provided with cooperable interengageable lugs or teeth 74 best brought out in Figs. 1 and 5 and which when in engagement with each other lock the nut 30 and sleeve 70 against relative rotation with respect to each other.

The sleeve 70 is maintained against relative rotation on the shank portion 16 but instead of doing this in the manner of my prior patent, that is by a pin in the shank and cooperating slots in the sleeve, in accordance with the present invention a hexagonal or other polygonal element 76 is pressed upon the outer end of the shank portion 16, and the bore 78 of the sleeve 70 is made of a cross-sectional configuration such as to slidably but non-rotatably receive the element 76 therein. The element 76 is pressed upon the shank portion 16 with sufficient tightness to prevent any inadvertent rotational or axial movement thereof on the shank portion 16 and thus not only serves to prevent relative rotation of the sleeve 70 on the shank of the tool but also serves as an abutment face between which and the internal shoulder 80 of the sleeve 70 the spring 72 may be confined. This method of maintaining the sleeve 70 against rotation and providing an abutment for the spring 72 is much more satisfactory in operation and more economical to manufacture than the construction provided for the same purpose in my prior patent.

As will be appreciated with the construction thus described, when it is desired to shift the stop position of the sleeve 32 axially of the countersink 24 to vary the depth of the opening which the countersink is to form, all that is necessary is to retract the sleeve 70 axially of the shank of the tool against the force of the spring 72 a sufficient distance to disengage the teeth 74 of the sleeve 70 and nut 30 from each other, upon which the nut 30 may be rotated to shift its axial position the required amount and upon this being accomplished the pressure on the sleeve 70 may be relieved to permit the spring 72 to return the sleeve 70 to its normal position in which the teeth 74 on the sleeve 70 and nut 30 will be re-engaged, thus locking the nut 70 in its axially adjusted position.

In connection with the pilot 25, in my prior patent the equivalent pilot was formed by a pin of the diameter of the desired pilot projecting in full diameter through the countersink and terminating in a head at the rear end of the countersink. Such former type of construction limited the countersink to the use of one size of the pilot. In the construction shown the pilot 25 may, of course, be made of any desired diameter to cooperate with any particular size of hole in which it is to be guided and the shank 26 may be made of the same diameter in all cases. I have found, however, that where the pilot 25 is made of larger diameter than the pin or shank 26 thereof and the rear end of the pilot 25 terminates in a shoulder perpendicular to the axis thereof, an undesirable gap is provided between the rear edge of the pilot and the cutting edges of the countersink which gap, particularly where the countersink is employed on relatively thin material, permits an undesirable flutter or vibration of the tool as the pilot passes through the work and as the cutting edges of the countersink begin to engage the work. In accordance with the present invention this disadvantage is eliminated in the manner best illustrated in Fig. 7 from which it will be noted that the rear face of the pilot 25 is inwardly cut away to provide a conical face 84 which intersects the outer surface of the pilot 25 at the rear edge thereof so as to form a feathered edge. The angularity of the cone surface 84, that is the included angle between the opposite sides thereof is less than that in which the cutting edges of the countersink 24 lie so that such feathered edge contacts the cutting edges of the countersink, thus eliminating any break in the continuity between the cutting edges of the countersink and the outer surface of the pilot. It will be appreciated, of course, that this arrangement eliminates the cause of the flutter where such break occurs and for that reason the construction shown is desirable.

Having thus described my invention, what I claim by Letters Patent is:

1. In a countersink structure of the class wherein there is a shank portion and a bit portion, a nut threadably mounted on the shank portion, a sleeve surrounding said shank portion in rotatable and relatively axially movable relation with respect thereto and extending into shrouding relation with respect to said bit portion, said nut cooperating with said sleeve for limiting axial movement of the latter in one direction, a second sleeve mounted on said shank portion in cooperative relation with respect to said nut, spring means surrounding said shank and constantly urging said second sleeve axially towards the nut, and cooperating inter-engageable teeth formed on said second mentioned sleeve and said nut, respectively, for releasably locking them together against relative rotation with respect to each other, the combination with said shank, said second mentioned sleeve and said spring of means for maintaining said second mentioned sleeve against relative rotation with respect to said shank and forming an abutment for said spring comprising a polygonal member concentric with said shank and press fitted thereon in abutting relation with respect to said spring, and said sleeve having a bore therein complementary in cross-sectional configuration to the cross-sectional configuration of said polygonal member and axially slidably surrounding the same.

2. In a device of the class described wherein there is a shank, a nut rotatably mounted on said shank, a sleeve on said shank provided with an internal shoulder, and said sleeve and said nut having cooperable releasably engageable complementary teeth at their adjacent ends, the combination with said shank and sleeve of means for maintaining said sleeve against relative rotation on said shank comprising a polygonal member press fitted on said shank concentrically therewith within said sleeve, said sleeve having a bore the cross-sectional configuration of which is complementary to the cross-sectional configuration of the interior of said polygonal member whereby to limit relative rotation of said sleeve with respect to said shank but permitting relative axial movement between them, and a coil spring surrounding said shank between said polygonal member and said shoulder constantly urging said sleeve axially toward said nut.

3. In a countersink, in combination, a countersink bit having a plurality of cutting edges arranged to lie in a conical surface concentric with the axis of said bit, said bit having an axial bore therethrough, a pilot member comprising a pin and an enlarged pilot head thereon, said pin being received in said axial bore, and that end surface of said head to which said pin is connected being undercut to provide it with a feather edge at the peripheral surface of said head, said feather edge contacting the cutting edges of said bit.

4. In a countersink structure, in combination, a countersink bit having an axial bore therethrough and provided with a plurality of angularly spaced cutting edges arranged in the surface of a cone concentric with the axis of said bit, a pilot pin received in said axial bore of said bit, a generally cylindrical pilot and head on said pin of greater diameter than said pin, that end surface of said head to which said pin is secured being axially relieved inwardly of the outer surface thereof whereby to provide a feathered rear edge to said head lying in the peripheral surface thereof, said relief being sufficient to receive the point of said bit therein and to bring said feathered edge into substantial contact with the cutting edges of said bit.

STUART A. COGSDILL.